(12) United States Patent
Carlin et al.

(10) Patent No.: US 7,702,493 B2
(45) Date of Patent: Apr. 20, 2010

(54) METHOD FOR QUALITY ASSURANCE OF SCREW JOINT TIGHTENING

(75) Inventors: Carl-Gustaf Carlin, Tyresö (SE); Bo Lennart Hellmark, Stockholm (SE)

(73) Assignee: Atlas Copco Tools AB, Nacka (SE)

( * ) Notice: Subject to any disclaimer, the term of this patent is extended or adjusted under 35 U.S.C. 154(b) by 975 days.

(21) Appl. No.: 10/563,905

(22) PCT Filed: Jul. 6, 2004

(86) PCT No.: PCT/SE2004/001100

§ 371 (c)(1),
(2), (4) Date: Jun. 19, 2006

(87) PCT Pub. No.: WO2005/002798

PCT Pub. Date: Jan. 13, 2005

(65) Prior Publication Data

US 2006/0241815 A1    Oct. 26, 2006

(30) Foreign Application Priority Data

Jul. 7, 2003    (SE) .................................... 0301984

(51) Int. Cl.
*G06F 9/455*    (2006.01)
(52) U.S. Cl. ........................................ 703/7; 73/862.23
(58) Field of Classification Search .................. 703/7; 73/862.23; 700/275; 433/174, 173; 29/407.01, 29/407.02; 173/93.5, 1, 181
See application file for complete search history.

(56) References Cited

U.S. PATENT DOCUMENTS

| | | | |
|---|---|---|---|
| 4,685,050 A | | 8/1987 | Polzer |
| 5,893,420 A | * | 4/1999 | Schoeps ..................... 173/181 |
| 5,901,794 A | * | 5/1999 | Schoeps et al. ............. 173/93.5 |
| 6,047,455 A | * | 4/2000 | Hansson ................... 29/407.02 |
| 6,341,533 B1 | * | 1/2002 | Schoeps .................. 73/862.23 |
| 6,358,051 B2 | * | 3/2002 | Lang et al. ................... 433/173 |
| 6,539,603 B1 | * | 4/2003 | Bulow ....................... 29/407.01 |
| 6,547,565 B1 | * | 4/2003 | Dawood et al. ............. 433/174 |
| 6,785,591 B1 | * | 8/2004 | Hansson ...................... 700/275 |
| 2002/0127516 A1 | * | 9/2002 | Lang et al. .................. 433/173 |
| 2003/0006049 A1 | * | 1/2003 | Ginell ........................... 173/1 |

FOREIGN PATENT DOCUMENTS

EP    1015187 B1 *    8/2002

* cited by examiner

*Primary Examiner*—Paul L Rodriguez
*Assistant Examiner*—Kandasamy Thangavelu
(74) *Attorney, Agent, or Firm*—Frishauf, Holtz, Goodman & Chick, P.C.

(57) ABSTRACT

A method for quality assurance of screw joint tightening results when tightening a screw joint to a needed pretension condition ($F_N$) by means of a torque delivering power tool, wherein one or more simulation procedures of a screw joint tightening process via a specific algorithm aiming at the needed pretension condition ($F_N$) by using programmed data relating to the screw joint geometry, expected frictional conditions, power tool characteristics, a tightening strategy and suitable tightening parameter values, thereby arriving at a simulated pretension condition ($F_S$) which is compared to the resultant pretension condition ($F_P$) of a practically performed tightening process performed via the same specific algorithm, and evaluating the outcome of the comparison for quality acceptance or refusal.

8 Claims, 2 Drawing Sheets

METHOD FOR QUALITY ASSURANCE OF SCREW JOINT TIGHTENING

This application is a U.S. National Phase Application under 35 USC 371 of International Application PCT/SE2004/001100 filed Jul. 6, 2004.

FIELD OF THE INVENTION

The invention relates to a method for assuring the quality of screw joint tightening processes where screw joints are tightened to a needed pretension condition, a needed clamp force in particular, by means of a torque delivering-power tool.

BACKGROUND OF THE INVENTION

When tightening screw joints, especially the typical screw joints of the motor vehicle industry and similar volume production, a homogeneous and well defined clamp force is the target in a majority of the applications. Various methods have been developed to control the clamp force by the indirect means of torque, angle and time measurements, i.e. the measurable parameters of a typical screw joint tightening. During the design phases of a screw joint theoretical calculations complemented with full scale tests or simulations help to decide which tightening method should be used.

A modern screw joint tightening system, like the Power-MACS-system marketed by Atlas Copco, comprises one or more electric nutrunner spindles, and a monitoring and control system including a process computer or system intelligence. Each nutrunner spindle is equipped with one or two torque transducers and one or two angle encoders. The system measures the motor current and the motor speed in various ways.

Various methods have been developed for controlling, or eliminating to the largest possible extent, the negative influence of the friction between thread and contact surfaces, screw geometry and material properties. All these methods are based on software algorithms which form part of the controller programs and make it possible to control and compensate for most of the encountered variations in the production process.

A simulation program is used in the above mentioned screw joint tightening system, PowerMACS, for simulating production results assuming certain hardware, joint characteristics and variable input parameters and using the same software parameters as used in the actual screw joint tightening performed by the Power MACS. The results of the simulations are reported as production statistics normally evaluated by the QA-engineers of the industry. With the representative screw joint data, system hardware and software the simulation program has the advantage of being able to calculate also the screw joint clamp force which is the most wanted information. Under production conditions information of the achieved clamp force is obtainable indirectly only, which is a shortcoming.

SUMMARY OF THE INVENTION

The main object of the invention is to obtain reliable information on tightening results by combining data resulting from the actual production with simulated results based on various parameters, whereby inter alia information of the clamp force may be continuously reported.

The most important input parameters used in the simulation procedure are the screw joint characteristics, including the torque-angle gradient which is a fairly good definition of the combined characteristics of the screw and the elements being clamped. A continuous calculation of the torque-angle gradient elevates the tightening results reporting to a higher level.

The method according to the invention also makes it possible not only to report of installed torque and angle, but is able to continuously report of torque rate values and certain statistics like Cpk (capability index for the system). It also allows for reporting of a continuously simulated clamp force as well as warnings for changed surface treatments and friction conditions of the screw joint etc. The reporting may also contain not only graphs showing typical torque-angle or torque-time curves but clamp force vs. angle and/or clamp force vs. time.

The new method means an improvement as regards understanding of the production and for suggestions of what kind of improvements of the tightening process that can be achieved.

BRIEF DESCRIPTION OF THE DRAWINGS

The invention is described below in further detail with reference to the accompanying drawings in which.

DETAILED DESCRIPTION

It all starts at the top of the flow chart with the basic design of the screw joint intended for the actual clamping of two or more elements, including the design of the elements themselves. The purpose of the screw joint is to accomplish a certain pretension condition or needed clamp force $F_N$.

In a second step, a simulation of a tightening process is performed, wherein details of the screw joint like screw geometry and surface treatment are chosen, as is the type of power tool to be used and which tightening method should be applied. Also tightening parameters like torque level, angle of rotation and/or time interval are chosen on empirical grounds. The simulation comprises a number of simulated tightening processes based on randomly chosen parameter values within the deviation limits or tolerances of each parameter. The result is presented by the simulation program as a mean value and a scattering interval of the obtained clamp force, torque, angle and torque rate, i.e. torque growth per angle of rotation.

In a third step, the resultant simulated clamp force $F_S$ is compared to the needed clamp force $F_N$, and in case the result is outside certain tolerance limits a new simulation is performed with adjusted parameter values. This is repeated until an acceptable result is obtained where the obtained clamp force is within the tolerances for the needed clamp force $F_N$. From the simulation process there is obtained the parameter values of torque and angle as well as the torque rate.

In a fourth step, the parameter values used in the accepted tightening simulation process are applied in the control program of the screw tightening equipment for the practical production tightening.

In a fifth step, the production screw joint tightening is performed, and the resultant parameter values of torque $T_{ACT}$, angle of rotation $A_{ACT}$, torque rate $TR_{ACT}$ are compared with the simulated values and tolerance limits. Should the production values be outside the tolerance limits established by the simulated tightening the production is either stopped with reports of deviation or continued with alarm and reports of deviations.

Should in a sixth step the production still result in deviations outside the simulated tolerance limits established by the simulation process the screw joint may be conditioned for obtaining a lower/less scattering friction, and/or the production control program is calibrated with respect to the deviations in the tightening parameters. This may result in a second stop and report procedure where the alternative alerts are: alarm+continued production, alarm+production stop, reporting geometry deviations, or reporting surface deviations.

Figure 1:
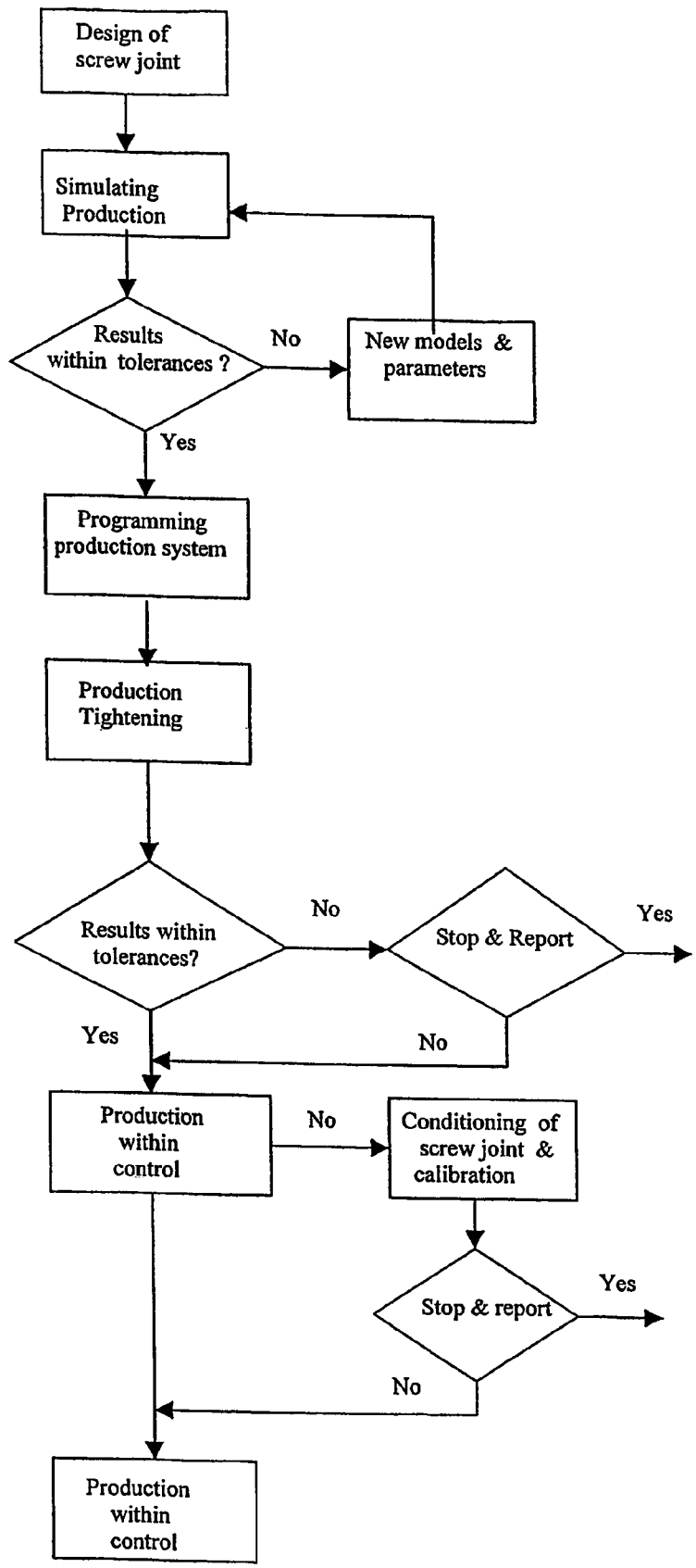
FIG. 1 shows a flow chart of progressive reporting of a tightening process according to the invention.
Figure 2:
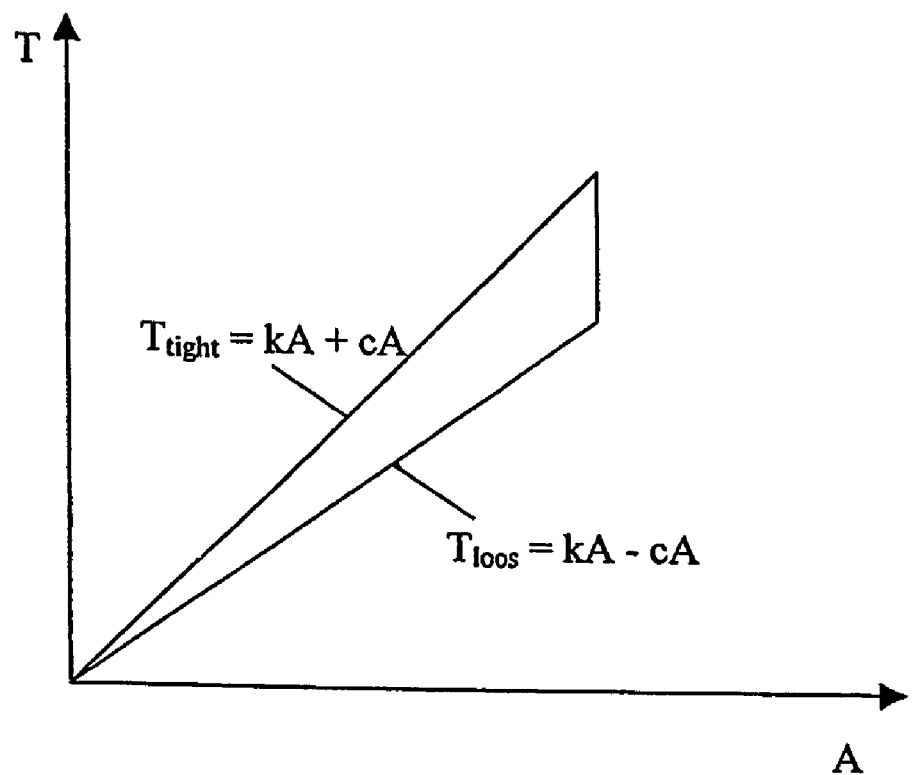
FIG. 2 shows a diagram illustrating the relationship between tightening torque and loosening torque.

In calibrating the friction the screw joint is tightened and loosened while the torque and angle values are registered and the torque–angle relationship is calculated in both directions. The torque is function of both the friction and the geometric features of the joint, like the thread pitch and the elasticity of the joint, and in the tightening direction the pitch and elasticity co-operate with the friction to build up a torque resistance. In the loosening direction, the friction still causes torque resistance whereas the geometry "helps" the nutrunner to turn the joint. This means that $T_{tight}=kA+cA$, whereof k is influenced by friction and c is influenced by the geometry of the joint. See FIG. 2. When loosening the joint applies: $T_{loos}=kA-cA$.

The respective gradients are: $dT_{tight}/dA=k+c$, and $dT_{loos}/dA=k-c$.

Accordingly: $k=\frac{1}{2}(dT_{tight}/dA+dT_{loos}/dA) \rightarrow k_{mean}; \rightarrow k_{dev}$
$c=\frac{1}{2}(dT_{tight}/dA-dT_{loos}/dA) \rightarrow c_{mean}; \rightarrow c_{dev}$ Various SPC techniques may be used to warn for deviations from expected values.

If $k_{mean}>k_{limit}$ there are surface and/or lubrication deficiencies.

If $c_{mean}>c_{limit}$ there are geometrical disturbances.

This is a way of determining the coefficient of friction, and whether the coefficient of friction is within normal deviation limits. If it is not the reason for deviations must be due to geometrical deficiencies in the screw joint. Accordingly, it is possible to determine whether it is a friction based deviation or a geometric ground for end result deviations. If changes have to be done to avoid faults in surface treatments or the design of the joint, new simulations have to take place.

The invention claimed is:

1. A method for quality assurance of screw joint tightening of a screw joint to a needed pretension condition ($F_N$) by a torque delivering power tool, comprising:

performing at least one simulation procedure of a screw joint tightening process via a specific algorithm aiming at said needed pretension condition ($F_N$) by using programmed data concerning screw joint geometry, expected frictional conditions, operational characteristics of the power tool, a chosen tightening strategy, and adaptable values of at least one tightening parameter, thereby arriving at a simulated pretension condition ($F_S$) acceptably close to said needed pretension condition ($F_N$), performing in practice a practical screw joint tightening process by controlling the power tool in accordance with said chosen tightening strategy and aiming at said needed pretension condition ($F_N$) by using said specific algorithm as well as programmed data concerning said screw joint geometry, said operational characteristics of the power tool, and tightening parameter values as derived from said simulation procedure, thereby arriving at a practically processed pretension condition ($F_P$), comparing said practically processed pretension condition ($F_P$) with said simulated pretension condition ($F_S$), and evaluating the outcome of said comparison for quality acceptance or refusal.

2. The method according to claim 1, wherein said simulation procedure is repeated a number of times and based on a method of randomly choosing values of said data within standard deviation ranges, thereby obtaining a mean value and a deviation range of said simulated pretension condition ($F_S$), and wherein said practically processed pretension condition ($F_P$) is compared to limits of said deviation range to obtain acceptance or refusal of said practically processed pretension condition ($F_P$).

3. The method according to claim 2, wherein the practical screw joint tightening process is performed repeatedly, and values of all resultant practically processed pretension conditions ($F_P$) are compared and statistically evaluated both with regards to the limits of said deviation range and to said mean value of said simulated pretension condition ($F_S$).

4. The method according to claim 3, wherein a practically processed pretension condition ($F_P$) falling outside the limits of said deviation range is analyzed by tightening and loosening of an actual screw joint, thereby determining whether there is a frictional or geometrical influence that has caused such unacceptable deviation of said practically processed pretension condition ($F_P$) falling outside the limits of said deviation range.

5. The method according to claim 2, wherein results of said at least one simulation procedure of the screw joint tightening process include parameter values of torque (T), angle of rotation (A) and torque rate (dT/dA) obtained at the simulated pretension condition ($F_S$), and parameter values obtained in the practical screw joint tightening process are compared to the parameter values obtained at said at least one simulation procedure of the screw joint tightening process.

6. The method according to claim 5, wherein a practically processed pretension condition ($F_P$) falling outside the limits of said deviation range is analyzed by tightening and loosening of an actual screw joint, thereby determining whether there is a frictional or geometrical influence that has caused such unacceptable deviation of said practically processed pretension condition ($F_P$) falling outside the limits of said deviation range.

7. The method according to claim 2, wherein a practically processed pretension condition ($F_P$) falling outside the limits of said deviation range is analyzed by tightening and loosening of an actual screw joint, thereby determining whether there is a frictional or geometrical influence that has caused such unacceptable deviation of said practically processed pretension condition ($F_P$) falling outside the limits of said deviation range.

8. The method according to claim 1, wherein results of said at least one simulation procedure of the screw joint tightening process include parameter values of torque (T), angle of rotation (A) and torque rate (dT/dA) obtained at the simulated pretension condition ($F_S$), and parameter values obtained in the practical screw joint tightening process are compared to the parameter values obtained at said at least one simulation procedure of the screw joint tightening process.

* * * * *